US006832258B1

(12) United States Patent
Öman

(10) Patent No.: US 6,832,258 B1
(45) Date of Patent: Dec. 14, 2004

(54) SYSTEM IN A BROADBAND NETWORK

(75) Inventor: Andreas Öman, Bagarmossen (SE)

(73) Assignee: Svenska Bredbandsbolaget Kapacitet AB, Stockholm (SE)

( * ) Notice: Subject to any disclaimer, the term of this patent is extended or adjusted under 35 U.S.C. 154(b) by 589 days.

(21) Appl. No.: 09/636,024

(22) Filed: Aug. 11, 2000

(30) Foreign Application Priority Data

Aug. 11, 2000 (SE) .............................................. 0002886

(51) Int. Cl.[7] .......................................... G06F 15/16
(52) U.S. Cl. ..................................... 709/229; 709/228
(58) Field of Search ................................. 709/203, 224, 709/225, 226, 227, 228, 229, 220, 221

(56) References Cited

U.S. PATENT DOCUMENTS

| 5,884,024 | A | * | 3/1999 | Lim et al. ..................... 713/201 |
| 5,894,479 | A | * | 4/1999 | Mohammed ................ 370/401 |
| 6,009,103 | A | * | 12/1999 | Woundy ....................... 370/401 |
| 6,118,768 | A | * | 9/2000 | Bhatia et al. ................ 370/254 |
| 6,219,715 | B1 | * | 4/2001 | Ohno et al. .................. 709/245 |
| 6,374,307 | B1 | * | 4/2002 | Ristau et al. ................ 709/249 |
| 6,381,638 | B1 | * | 4/2002 | Mahler et al. .............. 709/220 |
| 6,606,630 | B1 | * | 8/2003 | Gunlock ...................... 707/100 |
| 6,636,894 | B1 | * | 10/2003 | Short et al. ................. 709/225 |
| 6,643,661 | B2 | * | 11/2003 | Polizzi et al. ............... 707/100 |
| 6,643,693 | B1 | * | 11/2003 | Reynolds et al. ........... 709/223 |

FOREIGN PATENT DOCUMENTS

WO     WO 200131886     *  3/2001   ........... H04L/29/06

OTHER PUBLICATIONS

Cisco Systems, Inc., "New Cisco IOS NetFlow Software and Utilities Boost Service Provider Revenues and Service Management Capabilities", Press Release, Jul. 1, 1997.*

* cited by examiner

*Primary Examiner*—Marc Thompson
*Assistant Examiner*—Yemane M. Gerezgiher
(74) *Attorney, Agent, or Firm*—Pillsbury Winthrop LLP

(57) ABSTRACT

The invention relates to a system for control and supervision of residential control in a broadband network (10). It comprises at least one of the following features port control, class of service assurance, forced direction for network login, abuse and anti-spoof protection, provided by hardware and software broadband network (10) dedicated means (22, 24, 26, 28, 30). Thereby the system is providing services differentiation for customers to the network (10).

19 Claims, 1 Drawing Sheet ic # SYSTEM IN A BROADBAND NETWORK

TECHNICAL FIELD

The present invention pertains to a system for control and supervision of residential control in a broadband network.

PRIOR ART

An Internet Service Provider (ISP) is responsible for all existing IP addresses which are assigned to a customer in, for example, a broadband network by the IANA. All IP addresses leased to residential customers are dynamic and random assigned via a Dynamic DHCP.

Each computer is uniquely identified by a MAC-address. Based on the MAC-address the client is assigned an IP address. However the MAC-address is easy to change and can not be used as a secure identifier for each computer.

In an ethernet® network all connected to it share the same range of addresses. In a broadband over ethernet® network it is to be sure that each customer can only be assigned as many addresses per access class as they have brought or subscribe for. Each access class carries a specific type of network equipment, computers, IP Telephones, Set-Top boxes, etc.

Before any user can use services in a network according to the present invention they have to identify themselves to the network. There can be a plurality of users per each customer in the network, family members, employees, etc. Hence, there is a need for a controlled method of identifying each user before they can use any other provided services.

Clients or customers shall not be able to set static IP addresses on their own clients, because they should not be able to send traffic from an address which has not been assigned to them Other problems, or relating to those above, have to be solved in order to provide a feasible broadband network. These problems are mainly related to port control, forced redirections, traffic mediation, port snooping, IP to port logging, intelligent real time analysing.

SUMMARY OF THE DESCRIBED INVENTION

One aim of the present invention is to solve problems related to control and supervision of residential control in a broadband network.

In order to solve these problems the present invention sets forth a system for control and supervision of residential control in a broadband network. It comprises at least one of the following features provided by hardware and software broadband network dedicated means:

port control by feeding a protocol server for auto-configuration of client network parameters with information from a VMPS client providing that each network customer address can be connected to a unique name of a port for one customer inside the network;

class of service assurance for specific types of customer equipment denying attempts to lease additional customer addresses through said protocol server which keeps a record of all assigned addresses to said policy server;

forced redirection for network login procedure by redirecting a customers browser to a predetermined login procedure when a network connected computer/equipment is turned on, thus providing a controlled way of identifying each customer before using other available services;

abuse and anti-spoof protection by adjusting boarder gateway control routing tables in real time in respect of said protocol for auto-configuration.

In one embodiment it announces helper addresses as dynamic routes providing instant fail-over if a daemon fails by withdrawing routes from a network service provider boarder gateway control table, whereby a lower prioritized daemon immediately takes control.

Another embodiment comprises that it adjusts boarder gateway protocol routes to customer devices in real time according to a protocol for auto-configuration of client network parameters, thus enhancing load balancing in network fiber rings, and which provides that it is impossible for a customer to use an address without leasing it from said protocol server.

A further embodiment of the present invention comprises a real time traffic analyzing, detecting unauthorized servers run by a customer and software which provides a a network address.

A still further embodiment comprises that said port control controls activation and deactivation of residential access ports.

Another embodiment comprises that said port control provides the assigning of a static network address to a specific port and MAC address.

Yet another embodiment comprises that said forced redirection provides forced network portal logins.

One embodiment of the present invention comprises that it provides traffic mediation which enables the system to aggregate Cisco® NetFlow 24 information based an a resedential port.

A further embodiment comprises that it provides port snooping, looking at ports so to say, through display of port information or port link states.

Yet a further embodiment provides network addresses to residential port logging, which enables to find out who a specific network address was leased to at a given time, which provides abuse administration in a broadband network.

BRIEF DESCRIPTION OF THE DRAWING

Henceforth reference is had to the attached drawing and the accompanying text for a better understanding of the present invention and its examples and embodiments, wherein the single:

FIGURE illustrates a system for control and supervision of residential control in a broadband network in accordance with the present invention.

ABBREVIATIONS AND ACRONYMS

Figure 1:
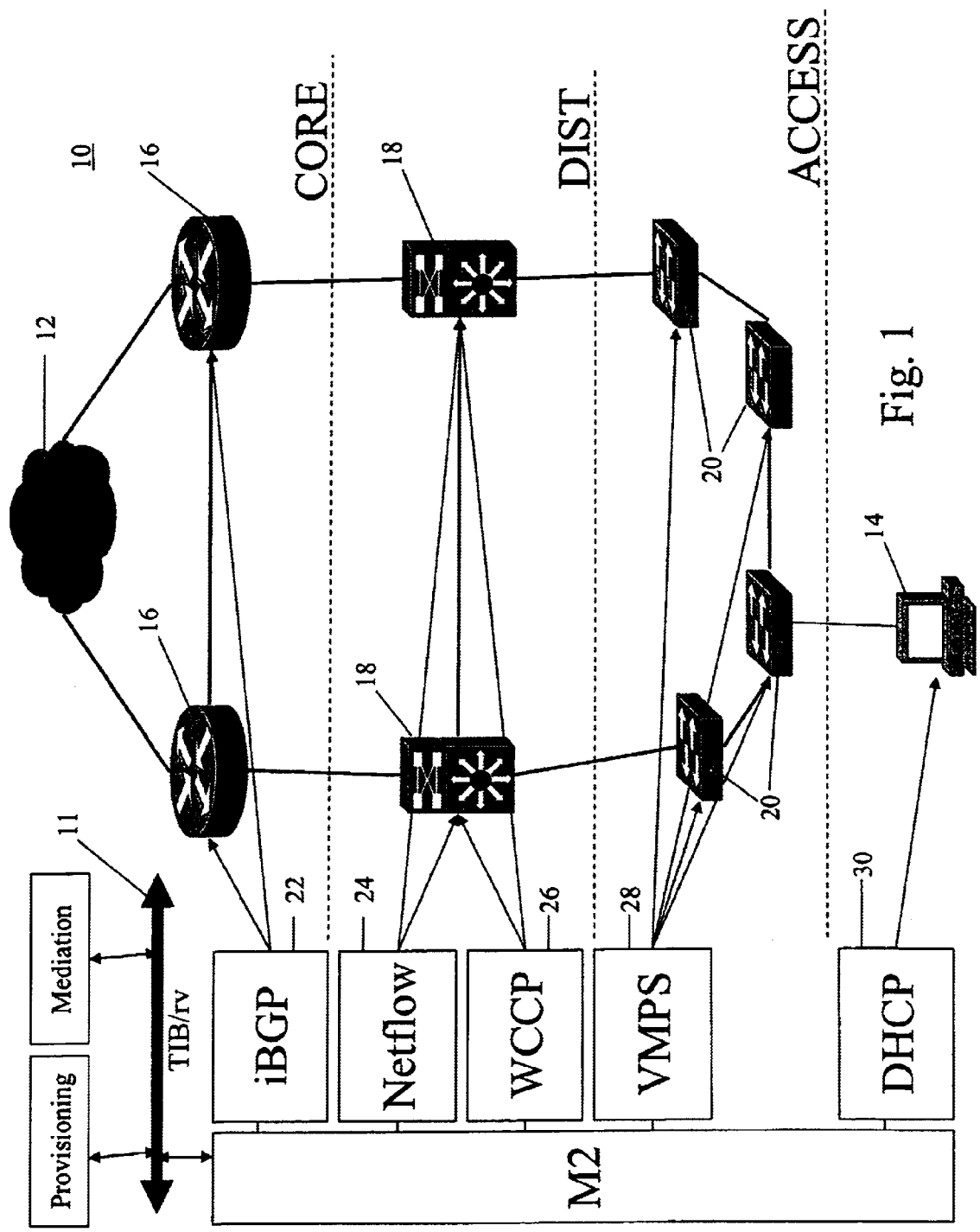

The following abbreviations and acronyms are used in the present description:
BGP-Border Gateway Protocol.
DRCP-Dynamic Host Configuration Protocol.
FQPN-Fully Qualified Port Name.
ISP-Internet Service Provider.
M2-working name of a project platform which provides new solutions for controlling and supervising access in a broadband network over Ethernet
MAC Address-Media Access Control Address.
VMPS-VLAN Membership Policy Server.
VQP-VLAN Query Protocol.

DETAILED DESCRIPTION OF PREFERRED EMBODIMENTS

The present invention sets forth a system, provided for control and supervision of residential control in a broadband network 10, schematically illustrated in the single FIGURE. M2 is a platform which incorporates standard network broadband means and protocols, and provides a base for new solutions for tracing, controlling and supervising access in a broadband network over Ethernet.

BGP was originally designed for carrying routing information between different ISP and has lately been used for carrying internal routes inside an ISP.

A DHCP is a protocol for auto-configuration of client network parameters.

FQPN is a unique name of a port inside a broadband network. Each FQPN is tied to only one customer.

M2 is a working name of a project platform for a broadband network, which subject is to develop and add new solutions for tracing, controlling and supervising access in a "broadband over ethernet" network or like networks. The present invention provides such a new solution.

A MAC address is unique for every network controller ever manufactured. Each manufacturer is assigned a span of addresses which they may use as it pleases them.

VQP is a protocol spoken between VMPS clients, and VMPS servers 28. The protocol sends information about new detected MAC Addresses, on which port the MAC Address was detected, number of existing MAC Addresses on the port, etc. It expects a response from the server if the client has access to the network and if so, information about which VLAN the port should be assigned to.

By feeding a DHCP server 30 with information from a VMPS server 28, each IP address can be tied to a FQPN in real-time and logged to a central server. The DHCP server 30 knows exactly how many addresses that have been assigned to each FQPN. Therefore it is able to deny any further attempts to lease additional addresses.

Through redirecting users web-browser to a login procedure when a computer 14, or other equipment including sufficient electronic intelligence, connected to the broadband network 10 is turned on it forces users to identify themselves to the network before any other web-site can be reached.

By adjusting BGP routing tables in the network 10 in real-time with respect to DHCP it is assured by the present invention that there is no feasible route to an address which has not been leased from the network 10.

Illustrated schematically in the attached FIGURE is a broadband network 10, and specifically set out are the parts that provide the present invention together with an example of a routing path for transmission of information in the broadband network 10 according to the present invention. Also connected to the path is the rest of a broadband network schematically illustrated as an area 12. This area 12 can comprise connections to other networks such as for example Internet, PSTN, GSM, or the like.

A middle-ware platform is chosen, here a TIB Rendezvous bus platform 11. By fully utilizing features in a TIB Rendezvous 11 software M2 is a 100% distributed and sealeable platform.

The network 10 illustrated is further comprising three main layers a core (CORE), a distribution layer (DIST), and a access layer (ACCESS) as indicated with a broken line in the FIGURE. Said core utilizes fast machines for transmitting IP traffic in the network such as routers 16 for choosing paths in big WAN/IP networks.

Layer DIST makes up the distribution part or the network 10, thus aggregating access equipment, illustrated as utilizing combined switches and routers 18 whereby the switch is used for simpler path choosing in a LAN.

Layer ACCESS makes up the access part of the broadband network, i.e., where customers are connected with there equipment 14, herein illustrated as utilizing switches 20.

The attached FIGURE illustrates a system for control and supervision of residential control in a broadband network it comprises further at least one, preferably all, of the following features provided by hardware and software broadband network dedicated means M2, 22, 24, 26, 28, and 30, see the attached FIGURE:

port control by feeding a protocol server DHCP 30 for auto-configuration of client network parameters with information from a membership policy server VMPS 28 providing that each network customer address can be connected to a unique name of a port for one customer inside the network 10;

class of service assurance for specific types of customer equipment denying attempts to lease additional customer addresses through said protocol server DHCP 30 which keeps a record of all assigned addresses to said policy server VMPS;

forced direction for network login procedure by redirecting a customers browser to a predetermined login procedure when a network connected computer 14 is turned on, thus providing a controlled way of identifying each customer before using other services;

abuse and anti-spoof protection by adjusting boarder gateway BGP control routing tables in real time in respect of said protocol for auto-configuration; and thereby providing services differentiation for customers.

With the system of the present invention advantages over prior art are elucidated and introduced below.

Regarding port control it introduces activation an deactivation of residential access ports. It further makes possible to assign each port to an access class. Each class has a set of attributes such as maximum IP addresses, maximum IP telephones etc which is an unique feature over prior art broadband networks. It also makes possible to assign a static IP address to a specific port and MAC address.

Forced directions are comprised in the present invention which makes it possible to redirect broadband traffic based on a set of predetermined conditions for such. Further, it introduces the possibility of forced portal logins for users.

The feature of traffic mediation is provided by the present invention which makes it possible to aggregate Cisco ® NetFlow information based on a residential port connected to the broadband network. To mediate on IP addresses alone is not useful since each customer is assigned a randomized IP address at every boot up. Therefore the system of the present invention is able to introduce the unique feature of a residential port for traffic mediation.

The feature port snooping makes it possible for the broadband network comprising the present invention to display port information on demand which makes troubleshooting much easier regarding customer services. It provides information about port link states, DHCP leases, packet flows etc.

Another feature provided by the system of the present invention is IP to residential port logging which makes it possible for the network depicted in the FIGURE to find out who a specific IP was leased to at a given time. This feature is necessary for administrating abuse in a broadband network.

Features belonging to the iBGP route injection 22, see FIGURE, are all unique to the broadband network of the present invention. The network announces all its helper addresses for DHCP 30, WCCP (Web Cash Control Protocol, a Cisco ® proprietary) 26 etc. as dynamic routes. This provides instant fail-over if a daemon fails, thus withdrawing routes from a BGP table and a lower prioritized daemon immediately takes over. As an additional unique feature in the present invention it adjusts iBGP routes to customer devices in real time according to DHCP 30 leases.

A daemon is a background process which acts as a server and dynamically accepts commands from other processes usually in the background.

From the iBGP route injection 22 feature according to the present invention follows that it is impossible for a customer to make use of an address without leasing it from the DHCP server. It also provides perfect load balancing features in city fiber rings.

A further unique feature for a broadband network and the system of the present invention provides intelligent real time traffic analyzing, whereby the network can detect unauthorized servers run by a customer over WWW, DNS (Domain Name System) etc. It can thus also provide software detection which software undertakes IP address translation. Such software could belong to IP masquerading, network PAT firewalls or proxy serves.

Means used in the present invention can be provided by software or a combination of software and hardware known to persons skilled in the art.

Although the present invention has been described through specific preferred embodiments, the scope of the invention is not limited merely to those for a person skilled in the art, it is what is claimed through the attached sets of claims that defines the scope of the present invention.

What is claimed is:

1. A system for control and supervision of residential control in a broadband network comprising a plurality of hardware and software broadband network dedicated units including at least a protocol server, and a membership policy server, wherein in order to provide service differentiation for customers, said plurality of units is configured to:

control a port by feeding a protocol server for auto-configuration of client network parameters with information from the membership policy server, said policy server providing that each network customer address can be connected to a unique name of a port for one customer inside the network;

assure a class of service for specific types of customer equipment while denying attempts to lease additional customer addresses through said protocol server, said protocol server keeping a record of all assigned addresses to said policy server;

provide forced direction for network login procedure by redirecting a customers browser to a predetermined login procedure when a network connected equipment is turned on, thus providing a controlled way of identifying each customer before using other services; and provide abuse and anti-spoof protection by adjusting border gateway control routing tables in real time with respect to said protocol for auto-configuration.

2. A system according to claim 1, wherein said plurality of units is further configured to announce helper addresses as dynamic routes providing instant fail-over if a daemon fails by withdrawing routes from a network service providers boarder gateway control table, wherein a lower prioritized daemon immediately takes control, which provides that it is impossible for a customer to use an address without leasing it from said protocol server.

3. A system according to claim 1, wherein said plurality of units is further configured to adjust border gateway protocol routes to customer devices/equipment in real time according to protocol for auto-configuration of client network parameters, thus enhancing load balancing in network fiber rings.

4. A system according to claim 1, wherein said plurality of units is further configured to provide real time traffic analyzing detecting unauthorized servers run by a customer and a software which provides network address translation.

5. A system according to claim 1, wherein said port control controls activation and deactivation of residential access ports.

6. A system according to claim 1, wherein said port control assigns a static network address to a specific port and MAC address.

7. A system according to claim 1, wherein said forced direction provides forced network portal logins.

8. A system according to claim 1, wherein said plurality of units is further configured to provide traffic mediation which enables the system to aggregate Cisco® NetFlow information based on a residential port.

9. A system according to claim 1, wherein said plurality of units is further configured to provide port snooping through display of port information or port link states.

10. A system according to claim 1, wherein said plurality of units is further configured to provide network address to residential port logging, which enables to find out who a specific network address was leased to at a given time so as to administer abuse in a broadband network.

11. A system for control and supervision of residential control in a broadband network comprising a plurality of hardware and software broadband network dedicated units including at least a protocol server, and a membership policy server, wherein in order to provide service differentiation for customers, said plurality of units is configured to provide real time traffic analyzing detecting unauthorized servers run by a customer and a software which provides network address translation, said plurality of units being further configured to at least:

control a port by feeding a protocol server for auto-configuration of client network parameters with information from the membership policy server, said policy server providing that each network customer address can be connected to a unique name of a port for one customer inside the network;

assure a class of service for specific types of customer equipment while denying attempts to lease additional customer addresses through said protocol server, said protocol server keeping a record of all assigned addresses to said policy server;

provide forced direction for network login procedure by redirecting a customers browser to a predetermined login procedure when a network connected equipment is turned on, thus providing a controlled way of identifying each customer before using other services; or provide abuse and anti-spoof protection by adjusting border gateway control routing tables in real time with respect to said protocol for auto-configuration.

12. A system according to claim 11, wherein said plurality of units is further configured to announce helper addresses as dynamic routes providing instant fail-over if a daemon fails by withdrawing routes from a network service providers boarder gateway control table, wherein a lower prioritized daemon immediately takes control, which provides that it is impossible for a customer to use an address without leasing it from said protocol server.

13. A system according to claim 11, wherein said plurality of units is further configured to adjust border gateway protocol routes to customer devices/equipment in real time according to protocol for auto-configuration of client network parameters, thus enhancing load balancing in network fiber rings.

14. A system according to claim 11, wherein said port control controls activation and deactivation of residential access ports.

15. A system according to claim 11, wherein said port control assigns a static network address to a specific port and MAC address.

16. A system according to claim 11, wherein said forced direction provides forced network portal logins.

17. A system according to claim 11, wherein said plurality of units is further configured to provide traffic mediation which enables the system to aggregate Cisco® NetFlow information based on a residential port.

18. A system according to claim 11, wherein said plurality of units is further configured to provide port snooping through display of port information or port link states.

19. A system according to claim 11, wherein said plurality of units is further configured to provide network address to residential port logging, which enables to find out who a specific network address was leased to at a given time so as to administer abuse in a broadband network.

* * * * *

UNITED STATES PATENT AND TRADEMARK OFFICE
CERTIFICATE OF CORRECTION

PATENT NO.        : 6,832,258 B1                                       Page 1 of 1
APPLICATION NO.   : 09/636024
DATED             : December 14, 2004
INVENTOR(S)       : Andreas Oman It is certified that error appears in the above-identified patent and that said Letters Patent is hereby corrected as shown below:

On title page, item 73 Assignee
      replace "Svenska Bredbandsbolaget Kapacitet AB"
      with --B2 Bredband AB, Arstaängsvägen 21 B, SE-117 43, Stockholm, Sweden--.

Signed and Sealed this
Twentieth Day of September, 2011

David J. Kappos
*Director of the United States Patent and Trademark Office*